United States Patent [19]

Filicetti

[11] Patent Number: 5,027,666
[45] Date of Patent: Jul. 2, 1991

[54] COMPACT COUNTER BALANCED PUMP JACK
[75] Inventor: A. Michael Filicetti, Helena, Mont.
[73] Assignee: Conoco, Inc., Ponca City, Okla.
[21] Appl. No.: 459,117
[22] Filed: Dec. 29, 1989
[51] Int. Cl.$^5$ ............................................. F16H 19/06
[52] U.S. Cl. ........................................ 74/37; 74/89.2; 74/590
[58] Field of Search ................... 74/37, 89.2, 89.21, 74/89.22, 590

[56] References Cited

U.S. PATENT DOCUMENTS

| | | | |
|---|---|---|---|
| 41,835 | 3/1864 | Drummond | 74/37 |
| 1,064,359 | 6/1913 | Middendorf | 74/37 |
| 1,097,333 | 5/1914 | Kinmont et al. | 74/37 |
| 1,423,102 | 7/1922 | Gerken | 74/590 |
| 1,599,395 | 9/1926 | Hards | 74/37 |
| 1,708,577 | 4/1929 | Hunter | 74/37 |
| 2,351,183 | 6/1944 | Blackburn | 74/37 |
| 2,681,623 | 6/1954 | Kane | 417/399 |
| 2,683,424 | 7/1954 | Kane | 417/399 |
| 2,977,808 | 4/1961 | Dobbs | 74/37 |
| 3,515,008 | 6/1970 | Davidescu et al. | 74/37 |
| 3,632,234 | 1/1972 | Lake | 417/390 |
| 4,483,662 | 11/1984 | Stanton | 417/53 |
| 4,497,616 | 2/1985 | Ratell | 417/390 |
| 4,651,582 | 3/1987 | Bender | 74/89.22 |
| 4,691,511 | 9/1987 | Dollison | 60/414 |
| 4,761,120 | 8/1988 | Mayer | 417/403 |
| 4,916,959 | 4/1990 | Lively | 74/37 |

FOREIGN PATENT DOCUMENTS 2718983 11/1977 Fed. Rep. of Germany .......... 74/37

Primary Examiner—Leslie A. Braun
Assistant Examiner—Scott Anchell
Attorney, Agent, or Firm—A. Joe Reinert

[57] ABSTRACT

A compact well jack is particularly suitable for reciprocating a long stroke rod pump and in situations wherein horizontal area around the well head is limited. The pump jack has a frame with elongated guides, a lifting bar slidably disposed between the guides, a horizontal slot in the lifting bar, pulleys carrying an endless belt having a stud affixed opposite to a counter weight and extending into the slot such that rotation of the pulleys vertically reciprocates the lifting bar and sucker rod string while the stud moves horizontally within the slot.

14 Claims, 4 Drawing Sheets

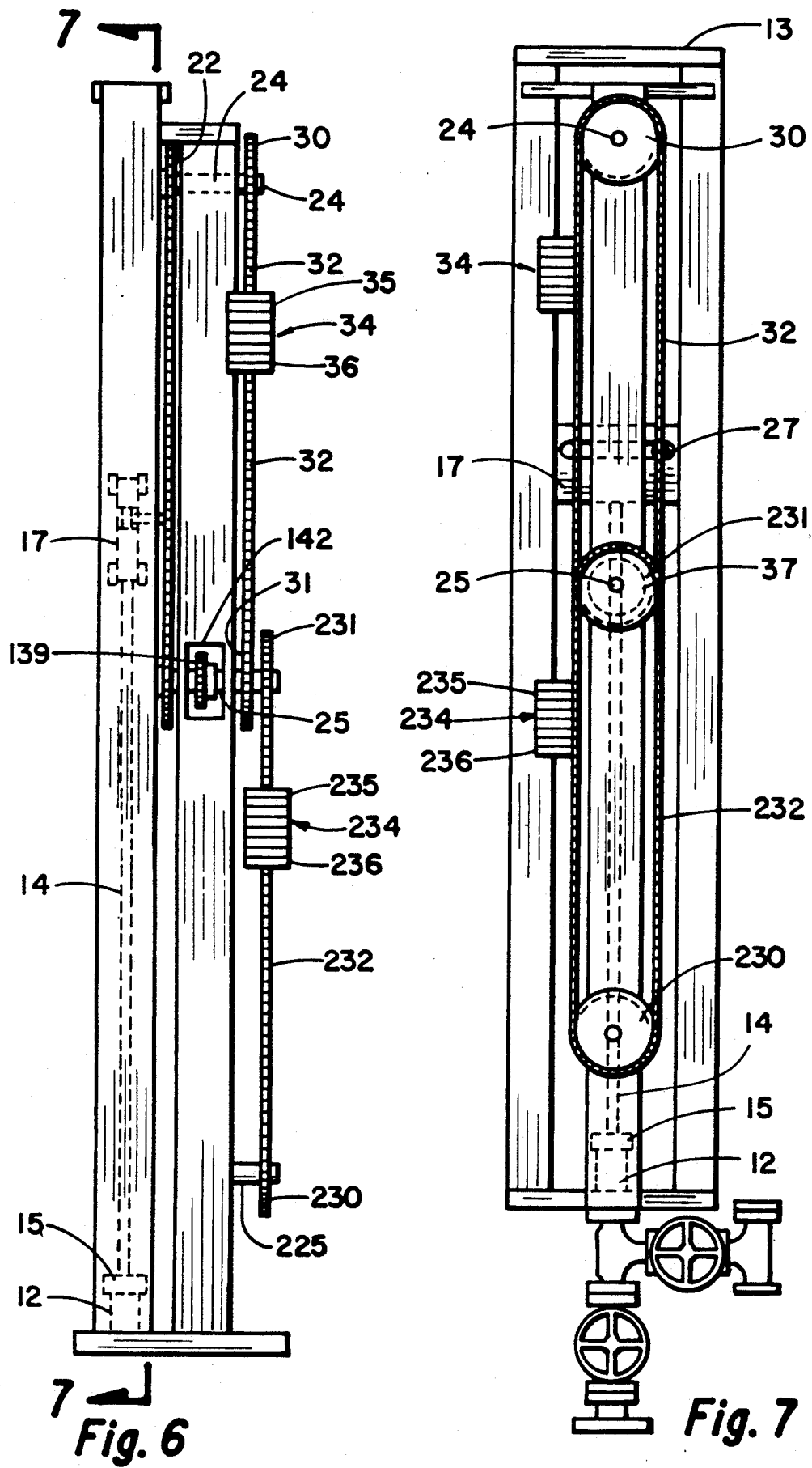

COMPACT COUNTER BALANCED PUMP JACK

BACKGROUND OF THE INVENTION

1. Field of the Invention

The present invention relates to a compact well jack, and more particularly to a pump jack of the counter balance type which is particularly adapted to reciprocating a long stroke rod pump.

2. Description of the Prior Art

With depleting oil reserves in the U.S., it is becoming more and more common to produce wells by pumping. The industry widely uses pumping systems including a downhole reciprocating pump having a plunger which is raised and lowered by a sucker rod string connected at the surface end of the well with a walking beam. This system is often referred to as a "rod pump". The rod pump is commonly reciprocated by a walking beam which is generally driven by pitman arms connected with crank arms rotated by a shaft which is driven by an electric motor or an internal combustion engine, commonly using natural gas or liquified petroleum gas as fuel. The motor or engine is coupled with the shaft through belts, chains, and some form of transmission. Counter weights are generally mounted on the crank arms. The center of the walking beam is pivoted on a samson post at a sufficient height to permit the beam to rocked by the pitman arms for raising and lowering the sucker rod string in the well.

The conventional walking beam type pumping jack or unit, though very widely used, is not a particularly efficient system having many bearings and other parts which are subject to wear. It is also often quite large and expensive when used on deep wells. For example, such a pump having a stroke of twenty feet may be forty feet high. Obviously, such a pump will have a large, long walking beam and quite heavy counter weights. Some deep wells have even been known to use pumps having an eighty foot stroke. The massive components of such a pumping system must be moved during the operation of the pump causing substantial wear in the many bearings, gears, and other elements in the drive system and require time consuming and expensive maintenance Even with the foregoing disadvantages, the conventional beam pump jack is looked upon by the industry as being "tried and true" and is not likely to be widely displaced for most shallow artificial lift operations. It does, however, have two serious disadvantages in specialized situations where improved pumping systems are needed.

On offshore platforms, where space is very limited, depletion of reserves leads to the need for artificial lift, and most offshore platforms simply do not have the room needed or the load bearing capacity available to install banks of huge walking beam pump jacks.

In very deep wells, use of a very long stroke is particularly advantageous because of the elastic effect of the long strings of sucker rod. With a walking beam pump, it is necessary to go to a truly massive piece of equipment to get the length of stroke needed.

The two foregoing disadvantages of conventional walking beam are addressed by U.S. Pat. No. 4,651,582 which seems to be the closest approach to the invention of this application found in a limited search of prior U.S. patents.

There, however, remains a need in the industry for improved pump jacks, particularly for deep well operations and for use on offshore platforms.

SUMMARY OF THE INVENTION

Accordingly, it is the general purpose and object of the present invention to provide a counter balanced pump jack which is relatively light which occupies a minimum of horizontal area, and which is capable of imparting long strokes to a sucker rod string connected to a rod pump.

In accordance with my invention, while certain specific arrangement of parts and steps have been illustrated for the purpose of the present disclosure, numerous changes in the construction and arrangement of steps and parts may be made by those skilled in the art, which changes are encompassed within the scope and spirit of the present invention as defined by the appended claims.

Concisely, a pump jack for reciprocating a rod string disposed in a well comprises seven elements, six of which are basic.

The first element comprises a frame adapted for vertical placement on the well, the frame having an upper end and a base for support thereof on a surface near the mouth of the well. The frame has a plurality of elongated guides extending upward from adjacent to the mouth of the well parallel to the long axis of the well when the frame is emplaced on the well.

A second element comprises a lifting bar is disposed between the guides of the frame such as to have freedom of movement only parallel to the long axis of the well. The lifting bar is adapted to be connected to the rod string and has a slot therein which extends to either side of the long axis of the well when the frame is emplaced vertically on the well.

A third element comprises at least two pulleys mounted on the frame adjacent to the guides such as to have freedom of rotation about an axis of rotation perpendicular to the elongation of the guides.

A fourth element comprises an endless belt tautly extending around two of the pulleys such that the two straight portions of the belt are parallel and adjacent to the guides.

A fifth element of the pump jack comprises a stud affixed to the belt and extending into the slot such that rotation of the pulleys reciprocates the lifting bar as the stud moves with the endless belt and such that the stud moves within the slot perpendicular to the elongation of the guides as it reverses direction in going around each end pulley with the portion of the endless belt to which it is affixed.

A sixth element comprises a counter weight affixed to the belt or a second belt at a point generally opposite the point at which the stud is affixed to the belt. The counter weight has a size and weight such as to substantially counter-balance the weight of the rod string including any attachments to the rod string such as a pump plunger and any volume of liquid lifted by the pump.

The final element comprises a driver coupled to at least one of the pulleys such as to rotate the pulleys, pull the belt, and reciprocate the rod string via the stud activating the lifting bar such as to reciprocate it along the guides.

In one presently preferred embodiment, a second set of pulleys having a second endless belt tautly extending around the pulleys is connected to the two end pulleys and mounted on the frame. A second counter weight is affixed to the second endless belt at a point corresponding to a point substantially opposite to the point that the stud is affixed to the first endless belt. The second counter weight affixed to the second endless belt can either wholly or partially replace the first counter weight affixed to the first endless belt, and it is presently preferred that it do so for rod strings of substantial length. The second set of pulleys rotates in concert with the two end pulleys as by mechanical connection to at least one of the two pulleys of the third element.

In another presently preferred embodiment, pulleys, endless belts, and counter weights comprising a mirror image of those of the previous preferred embodiment are disposed on the other side of the lifting bar and are connected via a common stud affixed to the corresponding belt on each side and extending into the slot on the lifting bar. The pulleys, belts, counter weights, etc. on each side of the lifting bar are driven in concert, as by like endless belts and like pulleys disposed on a common shaft.

Other preferred embodiments include combinations of the two basic embodiments heretofore set out. For example, the mirror image embodiment can have additional counter weights, pulleys, and endless belts which are disposed below and connected by shaft to the lower pulley of the two pulleys of third element. For further example, gangs of such pulley, endless belt, and counter weight combinations can be employed. The combinations can also be disposed above the upper pulley of the third element and connected via a shaft, or can be disposed otherwise if connected by pulleys and belts or the like, as is further described later in this specification.

BRIEF DESCRIPTION OF THE DRAWINGS

The drawings show presently preferred embodiments wherein a second set of pulleys is employed.

FIG. 6 corresponds to FIG. 3 and shows another embodiment wherein a third set of pulleys having a third endless belt tautly extending around the pulleys is connected to the lower of the two end pulleys mounted on the frame.

FIG. 7 is a back view with reference to FIG. 6 or a view from right to left with reference to FIG. 6 as indicated by arrows 7.

DESCRIPTION OF THE PREFERRED EMBODIMENT

Figure 1:
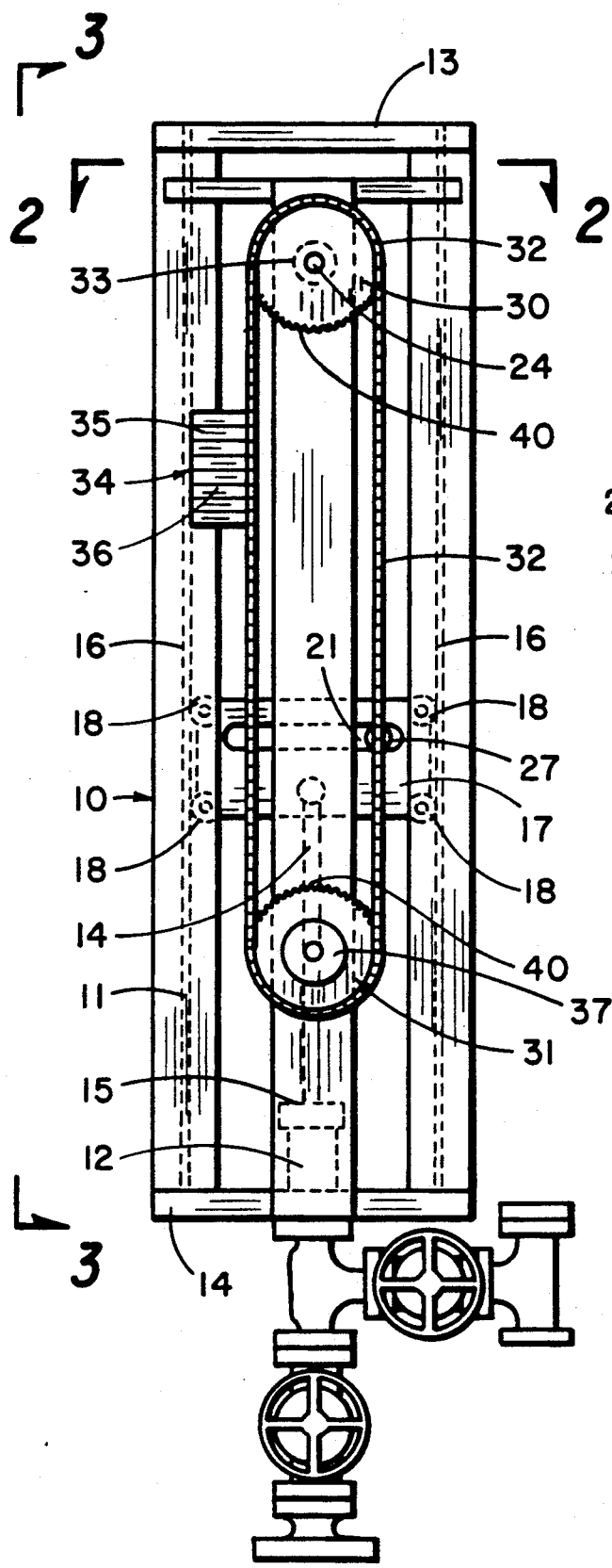
FIG. 1 is a side view of one presently preferred embodiment.
Figure 2:
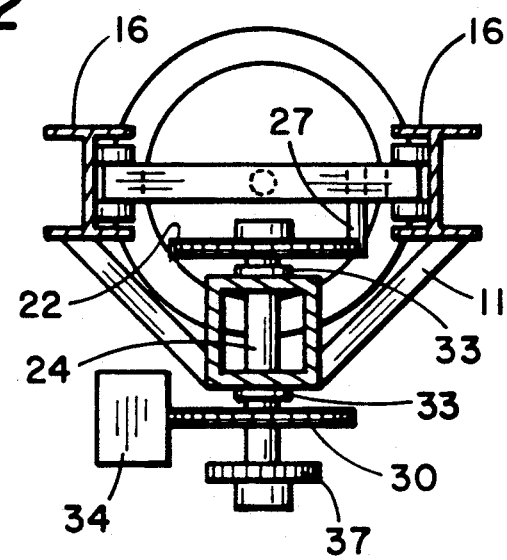
FIG. 2 is a top view with reference to FIG. 2 looking downward as indicated by arrows 2.

As shown in FIGS. 1-4, a basic embodiment of the inventive pump jack, generally designated by the numeral 10, comprises a frame adapted for vertical placement on a well 12 plus other elements and features as follow. The frame has an upper end 13 and a base 14 suitable for support of the frame on any convenient surface (not shown) near the mouth 15 of the well 12.

The frame has two elongated guides 16 extending upward from adjacent to the mouth of the well parallel to the long axis of the well when the frame is emplaced. A lifting bar 17 having rollers 18 is disposed between the guides such as to have freedom of movement only parallel to the long axis of the well. The lifting bar 17 is connected to rod string 19 via connecting bearing 20. The lifting bar has a slot 21 which extends to either side of the long axis of the well when the frame is emplaced vertically on the well.

A first set of pulleys 22 and 23 are mounted on the frame adjacent to the guides 16 such as to rotate with shafts 24 and 25 such that the axis of rotation is perpendicular to the elongation of the guides 16. A first endless belt 26 tautly extends around the pulleys such that the two straight portions of the belt are parallel and adjacent to the guides 16.

Figure 4:
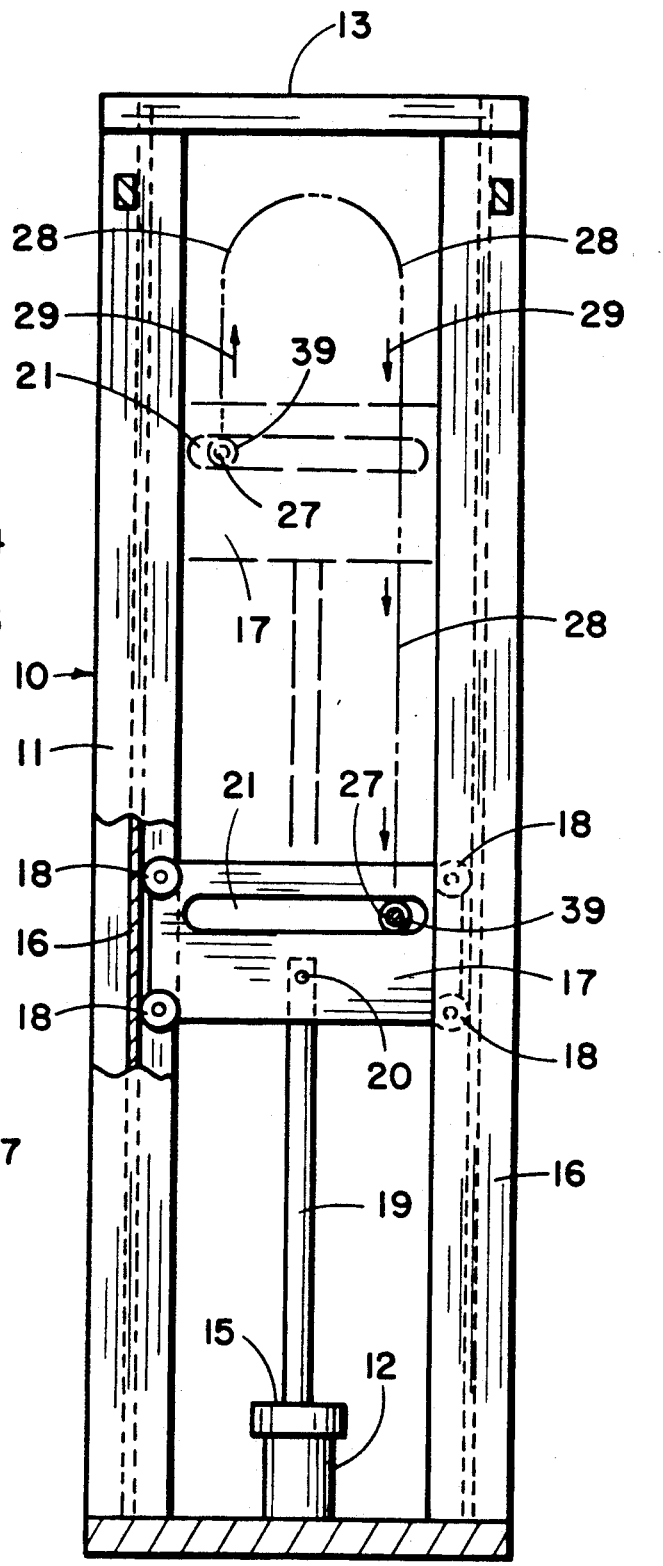
FIG. 4 is a back view with reference to FIG. 1 or a view from the right of FIG. 3 along arrows 4.

A stud 27 is affixed to the belt 26 and extends into the slot 21 such that rotation of the pulleys 22 and 23 reciprocates the lifting bar 17 as the stud moves with the endless belt 26 and within the slot 21 perpendicular to the elongation of the guides 16 as it reverses direction as shown in phantom line 28 and arrows 29 in going around each end pulley with the portion of the endless belt to which it is affixed, as is particularly shown in FIG. 4.

A second set of pulleys 30 and 31 having a second endless belt 32 tautly extending around the pulleys 30 and 31 are connected to the first set of pulleys 22 and 23 by shafts 24 and 25 disposed in bearings 33 within frame 11. A counter weight 34 having segments exemplified by segments 35 and 36 is affixed to the second endless belt 32 at a point corresponding to a point substantially opposite to the point that the stud 27 is affixed to the first endless belt 26. Second pulleys 30 and 31 rotate in concert with first pulleys 22 and 23.

A driver (not shown) is connected to pulleys 23 and 31 via a driver pulley (not shown), a chain (not shown). a driven pulley 37 and a shaft 38.

A roller bearing 39 mounted on stud 27 reduces friction as the stud 27 reciprocates in slot 21. The pulleys have teeth 40 such as to be conventionally termed sprockets and the endless belts 26 and 32 have links such as to be conventionally termed chains.

Some non-limiting examples of variations which suggest themselves include the following:

The vertical distance between the pulleys can be adjusted by adjusting the vertical height of the frame and the length of the endless belts such as to vary the length of the stroke greatly. Thus, very long stroke pump jacks can be fabricated in accordance with my invention.

Rotary power can be fed to the pump jack by any number of means other than the pulley arrangement disclosed. For example, the drive shaft of an electric motor or the like can be directly coupled to shaft 24 or 25 or through a transmission.

Other means of friction reduction in the slot 21 and along the guides 16 other can be employed than the rollers shown. For example, the contacting surfaces can be surfaced with a material having a low coefficient of friction such as a polytetrafluroethylene or a polyphenylene material. The rollers can also have ball or tapered roller bearings. Other means of friction reduction can be employed throughout the design.

The endless belts and pulleys, in addition to being sprockets and chains, can be V-belts and pulleys adapted to accommodate the same or banks thereof.

Because of its ability to provide very long strokes, the pump jack of my invention is particularly suitable for pumping very heavy oil and for reciprocating very long strings of sucker rod.

Because of its relatively light-weight and compact design, particularly with regard to horizontal area required, it has particular applicability to offshore platforms where weight-bearing capacity and horizontal area may be very restricted.

Figure 3:
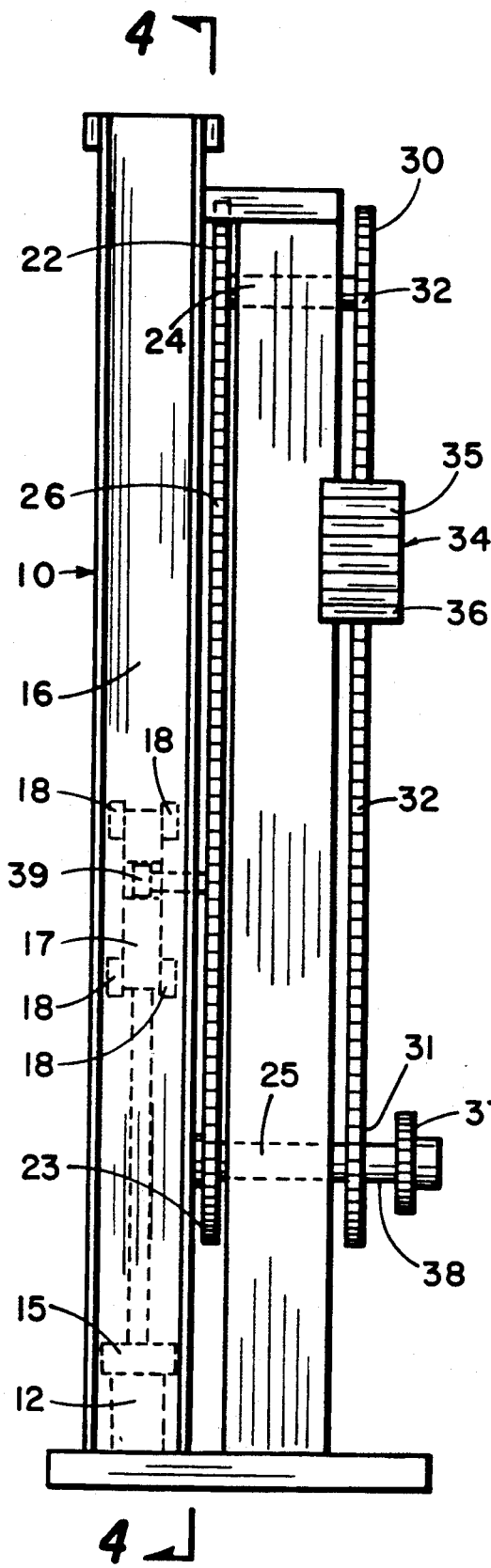
FIG. 3 is a side view looking from left to right with reference to FIG. 1 along arrows 3.
Figure 5:
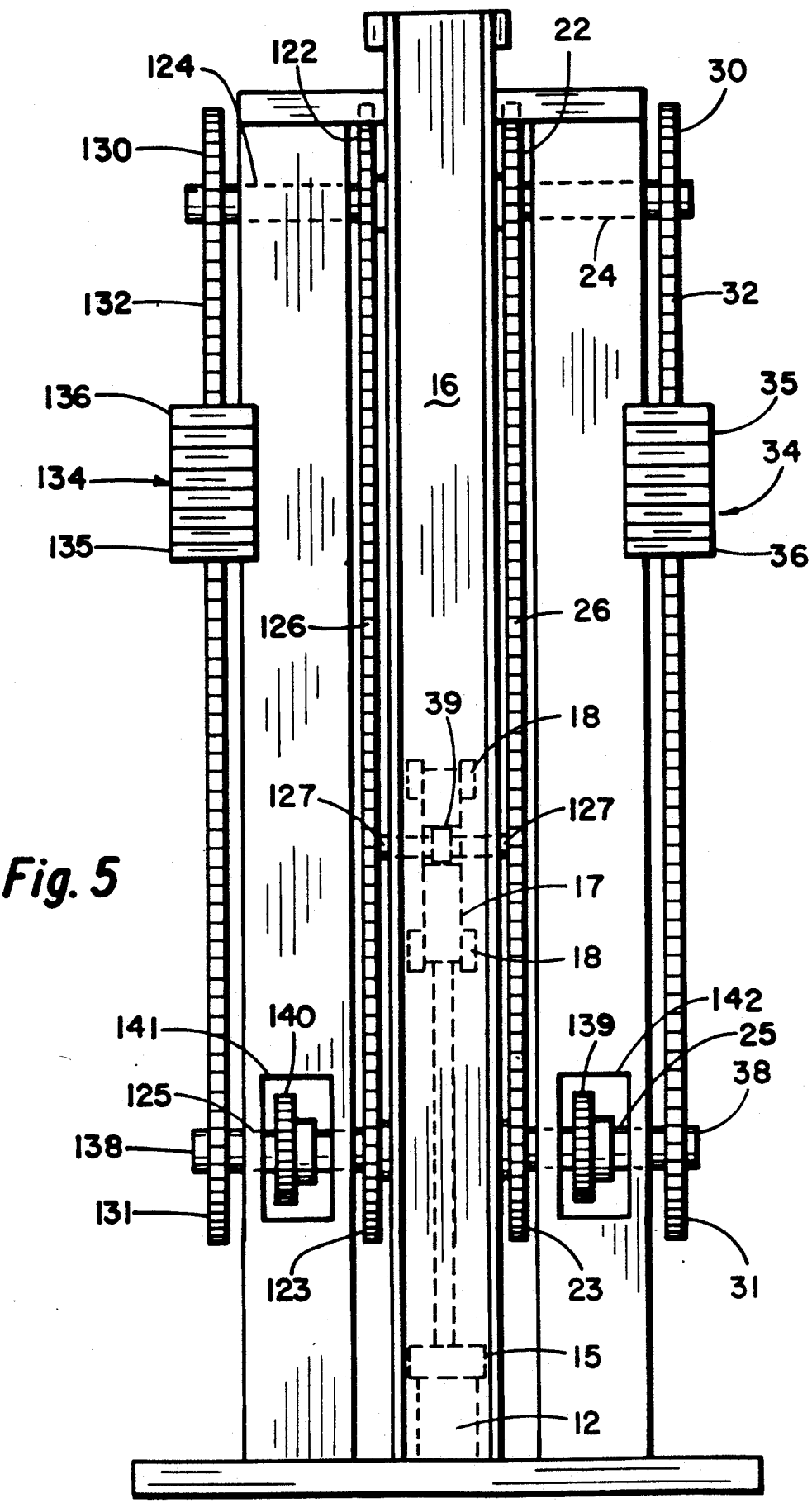
FIG. 5 is a view corresponding to the view of FIG. 3 of another presently preferred embodiment of the invention wherein a mirror image of the drive mechanism is disposed on the opposite side of the lifting bar.

Another presently preferred embodiment of the invention is shown in FIG. 5. FIG. 5 is a side view of the apparatus corresponding to that shown in FIG. 3. In this embodiment, the driving apparatus to the right of the lifting plate is essentially the same as that shown in FIG. 3 except that opening 142 is cut into the frame and driven pulley 139 is disposed about shaft 25 in replacement of driven pulley 37 and shaft 38 of the embodiment of FIG. 3; and stud 127 affixed to belt 26 and belt 126 replaces stud 27. The drive apparatus to the left of the lifting bar 17 is essentially a mirror image of the driving apparatus to the right of the lifting bar 17. Common features in FIG. 3 and FIG. 5 are numbered the same.

Thus, pulleys 122 and 123 are mounted on the frame adjacent to the guides 16 such as to rotate with shafts 124 and 125 such that the axis of rotation is perpendicular to the elongation of the guides 16. An endless belt 126 tautly extends around the pulleys such that the two straight portions of the belt are parallel and adjacent to the guides 16. The stud affixed to endless belts 26 and 126 reciprocates the lifting bar as the stud moves with the endless belts 26 and 126 and within a slot 21 perpendicular to the elongation of the guides 16 as it reverses direction in the same manner as shown by phantom line 28 and arrows in going around each end pulley with the portion of the endless belts to which it is affixed, as is particularly shown in FIG. 4.

A fourth set of pulleys 130 and 131 having a second endless belt 132 tautly extending around the pulleys 130 and 131 are connected to the two end pulleys 122 and 123 by shafts 124 and 125. A counter weight 134 having segments exemplified by segments 135 and 136 is affixed to the fourth endless belt at a point corresponding to a point substantially opposite to the point that the stud 127 is affixed to the first and third endless belts. Pulleys 22, 23, 30, 31, 122, 123, 130, and 131 all rotate in concert in this mode.

A driver, (not shown) is connected to driven pulleys 139 and 140 via driver pulleys (not shown), chains (not shown), and a shaft about which the driver pulleys are disposed such as to keep all pulleys moving in concert.

Banks or gangs of pulleys, belts, and weights corresponding to the second and fourth sets of pulleys, belts, and weights can also be employed by extending shafts 24, 124, 38, and 138 such as to obtain additional counter weight to counter-balance rod strings of substantial length and weight. This embodiment has particular advantage in that an unlimited amount of counter weight can be applied and the strength of the attachment of the stud 127 to belts 26 and 126 is greater.

FIG. 6 shows a view corresponding to that of FIG. 3 of yet another presently preferred embodiment of the invention wherein a fifth set of pulleys, a fifth belt and a fifth counter weight are employed. FIG. 7 shows a view from right to left with reference to FIG. 6 as indicated by arrows 7.

In this embodiment, the numbering and operation of elements of the upper portion is the same as for the embodiment of FIG. 5 and in part the same as for the embodiment of FIG. 3.

Additionally, the fifth pulleys 231 and 230 are affixed to shafts 25 and 225. Endless fifth belt 232 tautly extends around fifth pulleys 230 and 231, and counter weight 234 having segments 235 and 236 is affixed thereto.

In yet another presently preferred embodiment, a mirror image of the apparatus of FIG. 6 is disposed to the left of the lifting plate 17 (as viewed in FIG. 6) in the manner indicated in FIG. 5. Gangs or banks of pulleys 231 and 230, belts 232, and counter weights 234 can be disposed in mechanical linkage, as by affixing to shaft 25 and/or its counterpart shaft 125 or by locking in mechanical linkage by a simple belt and pulley arrangement, as to the right or left of the apparatus as shown in FIG. 7. Other means of mechanical linkage will suggest themselves to those skilled in the art, and it is only the upper shaft 24 and its counterpart shaft 124 (as viewed in FIG. 7).

In one other presently preferred embodiment, particularly useful in offshore platforms wherein horizontal area available for mounting a pump jack is particularly limited, it is preferable to mount pulleys 231 and 230, belt 232, and counter weight 234 in board as much as possible on shaft 25 and/or its counterpart shaft 125 as close as possible to pulleys 22 and 23 and to extend the counter weight and chain down into a well, for example, an enlarged well casing. If horizontal space is severely limited, then pulleys 30 and 31, belt 32 and counter weight 34 (and/or its counterpart pulleys 130 and 131, belt 132 and counter weight 134) can be dispensed with.

It is also within the scope of my invention to adjust the outer diameter of the pulleys (e.g., 30, 31, 231, 232, 130, 131, etc.) and the corresponding length of the belts (e.g., 32, 232, 132, etc.) if space available makes this desirable (such that shorter belts are used for larger diameter pulleys and visa versa), so long as the ratio is such that the counter weights remain in the proper relationship to the lifting bar.

I claim:

1. A pump jack for reciprocating a rod string in a well having a mouth comprising:

(a) a frame adapted for vertical placement on the well, the frame having an upper end and a base for support of the frame on a surface near the mouth of the well, the frame having a plurality of elongated guides extending upward from the base to the upper end and parallel to a long axis of the well when the frame is emplaced;

(b) a lifting bar disposed between the guides such as to have freedom of movement only along the long axis of the well, the lifting bar adapted to be connected to the rod string, the lifting bar having a slot therein which extends perpendicular to the long axis of the well when the frame is emplaced;

(c) at least two pulleys rotatably mounted on the frame adjacent to the guides such that their axes of rotation are perpendicular to the long axis of the well;

(d) a first endless belt tautly extending around two of the first pulleys such that the two straight portions of the first belt are parallel and adjacent to the guides;

(e) a stud affixed to the belt for circuitous movement therewith and extending into the slot such that rotation of the first pulleys reciprocates the lifting bar as the stud moves with the first endless belt through the straight portions and such that the stud moves within the slot as it goes around each first pulley;

(f) a counter weight affixed to the first belt for circuitous movement therewith and positioned at a point substantially opposite that of the stud, the counter weight having sufficient weight such as to substantially counter balance the weight of the rod string, any attachments thereto, and any column of liquid lifted thereby; and (g) a driver coupled to at least one of the first pulleys such as to rotate the first pulleys, pull the first belt, and reciprocate the rod string via the stud activating the lifting bar.

2. The pump jack of claim 1 wherein a friction reducing bearing is disposed about the stud within the slot, wherein the first endless belt is a drive chain, wherein the first pulleys are sprockets, and wherein friction reducing bearings are disposed between the guides and the lifting bar.

3. The pump jack of claim 2 wherein the counter weight affixed to the belt is segmented.

4. The pump jack of claim 1 wherein the endless belt is a drive chain, wherein the pulleys are sprockets, and wherein friction reducing bearings are disposed between the guides and the lifting bar.

5. The pump jack of claim 1 wherein the endless belt is a composite V-belt, wherein a friction reducing bearing is disposed about the stud within the slot, and wherein friction reducing bearings are disposed between the guides and the lifting bar.

6. The pump jack of claim 1 wherein a friction reducing bearing is disposed about the stud within the slot, wherein the endless belt is a drive chain, wherein the pulleys are sprockets, wherein friction reducing bearings are disposed between the guides and the lifting bar, wherein two elongated guides extend upward, and wherein the counter weight is segmented.

7. A pump jack for reciprocating a rod string disposed in a well having a mouth comprising:

(a) a frame adapted for vertical placement on the well, the frame having an upper end and a base for support of the frame on a surface near the mouth of the well, the frame having a plurality of elongated guides extending upward from the base to the upper end and parallel to a long axis of the well when the frame is emplaced;

(b) a lifting bar disposed between the guides such as to have freedom of movement only along the long axis of the well, the lifting bar adapted to be connected to the rod string, the lifting bar having a slot therein which extends perpendicular to the long axis of the well when the frame is emplaced;

(c) at least two pulleys rotatably mounted on the frame adjacent to the guides such that their axis of rotation is perpendicular to the long axis of the well;

(d) a first endless belt tautly extending around two of the first pulleys such that the two straight portions of the first belt are parallel and adjacent to the guides;

(e) a stud affixed to the belt for circuitous movement therewith and extending into the slot such that rotation of the first pulleys reciprocates the lifting bar as the stud moves with the first endless belt through the straight portions and such that the stud moves within the slot as it goes around each first pulley; and (f) a driver coupled to at least one of the first pulleys such as to rotate the first pulleys, pull the first belt, and reciprocate the rod string via the stud activating the lifting bar, wherein at least one of the first pulleys is paired with at least one of the respective second pulleys having a second endless belt tautly extending around the second pulleys and a counter weight is affixed to the second endless belt for circuitous movement therewith and positioned at a point corresponding to a point on the first belt substantially opposite that of the stud, the counter weight having sufficient weight such as to substantially counter balance the weight of the rod string, any attachments thereto, and any column of liquid lifted thereby.

8. A pump jack for reciprocating a rod string in a well having a mouth comprising:

(a) a frame adapted for vertical placement on the well, the frame having an upper end and a base for support of the frame on a surface near the mouth of the well, the frame having a plurality of elongated guides extending upward from the base to the upper end and parallel to a long axis of the well when the frame is emplaced;

(b) a lifting bar disposed between the guides such as to have freedom of movement only along the long axis of the well, the lifting bar adapted to be connected to the rod string, the lifting bar having a slot therein which extends perpendicular to the long axis of the well when the frame is emplaced;

(c) at least two pulleys rotatably mounted on the frame adjacent to the guides such that their axes of rotation are perpendicular to the long axis of the well;

(d) a first endless belt tautly extending around two of the first pulleys such that the two straight portions of the first belt are parallel and adjacent to the guides;

(e) a stud affixed to the belt for circuitous movement therewith and extending into the slot such that rotation of the first pulleys reciprocates the lifting bar as the stud moves with the first endless belt through the straight portions and such that the stud moves within the slot as it goes around each first pulley;

(f) a set of second pulleys having a second endless belt tautly extending around the second pulleys, the second pulleys mechanically connected to the first pulleys and mounted on the frame, a counter weight is affixed to the second endless belt for circuitous movement therewith and positioned at a point corresponding to a point on the first belt substantially opposite that of the stud, the counter weight having sufficient weight such as to substantially counter balance the weight of the rod string, any attachments thereto, and any column of liquid lifted thereby; and (g) a driver linked to at least one of the first pulleys or the second pulleys such as to rotate the first pulleys and second pulleys, pull the first belt and the second belt in concert, and reciprocate the rod string via the stud activating the lifting bar.

9. The pump jack of claim 8 wherein a friction reducing bearing is disposed about the stud within the slot, wherein the endless belts are drive chains, wherein the pulleys are sprockets, wherein friction reducing bearings are disposed between the guides and the lifting bar, and wherein the weight is segmented.

10. The pump jack of claim 8 wherein the first pulleys are connected to respective second pulleys by being affixed to a shaft common to each pair of first and second pulleys.

11. The pump jack of claim 8 wherein a lower of the first pulleys is connected to an upper of the second pulleys by being affixed to a common shaft and taut sides of the first belt are parallel to taut sides of the second belt.

12. The pump jack of claim 8 wherein the second pulleys and the second belt and counter weight are all disposed from and connected by a means for transmission of motion with the first pulleys and the first belt.

13. The pump jack of claim 8 wherein a second set of elements (c), (d), (e) and (f) which are a mirror image with respect to the lifting bar of the elements (c), (d), (e) and (f) are disposed on opposite sides of the lifting bar, wherein the stud of element (e) is affixed to both the first endless belt and its corresponding mirror image belt, and wherein all pulleys and belts are driven in concert.

14. The pump jack of claim 13 wherein the mirror image elements on both sides of the lifting bar are driven by a set of driven pulleys affixed to shafts which in turn are affixed to at least one of the first pulleys or the second pulleys and the mirror image thereof, a set of third belts, and a set of drive pulleys affixed to a drive shaft, wherein the set of third belts extend tautly around the sets of drive pulleys and driven pulleys respectively, such that all pulleys and belts are driven in concert.

* * * * *